United States Patent
Jeong et al.

(10) Patent No.: US 8,253,886 B2
(45) Date of Patent: Aug. 28, 2012

(54) BACKLIGHT ASSEMBLY AND LIQUID CRYSTAL DISPLAY APPARATUS HAVING THE SAME

(75) Inventors: Wee-Joon Jeong, Seoul (KR); Heung-Seok Kim, Yongin-si (KR); Jun-Hee Son, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 345 days.

(21) Appl. No.: 12/463,632

(22) Filed: May 11, 2009

(65) Prior Publication Data
US 2010/0123847 A1 May 20, 2010

(30) Foreign Application Priority Data

Nov. 14, 2008 (KR) .................. 10-2008-0113340

(51) Int. Cl.
*G02F 1/1335* (2006.01)
*G02F 1/1333* (2006.01)
(52) U.S. Cl. ............... 349/65; 349/58; 349/62
(58) Field of Classification Search .......... 349/62, 349/65
See application file for complete search history.

(56) References Cited

U.S. PATENT DOCUMENTS

| | | | | |
|---|---|---|---|---|
| 6,975,370 B2 * | 12/2005 | Yu et al. | ........................... | 349/65 |
| 7,597,468 B2 * | 10/2009 | Weng et al. | ................... | 362/612 |
| 7,671,936 B2 * | 3/2010 | Chang | ............................. | 349/65 |
| 7,903,198 B2 * | 3/2011 | Abe et al. | ........................ | 349/65 |
| 2005/0088586 A1 * | 4/2005 | Mori et al. | ...................... | 349/62 |
| 2008/0100775 A1 * | 5/2008 | Hsiao | ............................... | 349/65 |
| 2008/0129927 A1 * | 6/2008 | Hamada et al. | ................. | 349/65 |
| 2008/0158477 A1 * | 7/2008 | Hsiao | ............................... | 349/65 |
| 2009/0067158 A1 * | 3/2009 | Hamada | ....................... | 362/97.3 |
| 2010/0128195 A1 * | 5/2010 | Li et al. | ............................ | 349/58 |
| 2010/0277671 A1 * | 11/2010 | Kimura et al. | ................... | 349/64 |
| 2011/0043719 A1 * | 2/2011 | Thunhorst et al. | .............. | 349/58 |

FOREIGN PATENT DOCUMENTS

| | | |
|---|---|---|
| JP | 2008077965 A | 4/2008 |
| KR | 1020080025621 A | 3/2008 |
| KR | 1020080058795 A | 6/2008 |

\* cited by examiner

*Primary Examiner* — Rhonda Peace
(74) *Attorney, Agent, or Firm* — Cantor Colburn LLP

(57) ABSTRACT

A backlight assembly includes a first receiving container including a bottom plate, at least one sidewall extending from the bottom plate and an opening portion disposed in the sidewall, a printed circuit board disposed contacting an outer surface of the at least one sidewall and including a first side and a second side opposing the first side, a light source disposed on the first side of the printed circuit board and generating light emitted through the opening portion of the sidewall, and a light guide plate disposed on the bottom plate of the first receiving container, and guiding light emitted from the light source and incident to a light incident surface of the light guide plate.

21 Claims, 5 Drawing Sheets

BACKLIGHT ASSEMBLY AND LIQUID CRYSTAL DISPLAY APPARATUS HAVING THE SAME

This application claims priority to Korean Patent application No. 10-2008-0113340 filed on Nov. 14, 2008, and all the benefits accruing therefrom under 35 U.S.C. §119, the contents of which are herein incorporated by reference in its entirety.

BACKGROUND OF THE INVENTION

1. Field of the Invention

The present invention relates to a liquid crystal display device having a backlight device, and more particularly to an open portion formed on a sidewall of a first receiving container, receiving a light emitting diode mounted on a printed circuit.

2. Description of the Related Art

Liquid crystal display ("LCD") devices have been widely used in notebooks, personal digital assistants, cellular phones, and other electronic products because the price of LCDs is relatively low and the quality of LCDs is relatively high. LCDs are passive optical devices. Therefore, a frontlight module or a backlight module needs to be attached to the LCD panel to provide sufficient illumination to make the LCD device visible at night and display in full color. The backlight module includes a light source and at least one optical element, such as a light guiding plate and/or a diffusion sheet.

Backlight module units may be classified into two types according to a disposition of the light source, such as an edge-type and a direct-type. In an edge-type backlight unit, a light guide plate ("LGP") is disposed at a rear of an LCD panel and a light source is disposed at a side of the LGP. Light emitted from the light source is refracted in the LGP and is supplied to the LCD panel. In a direct-type backlight unit, a plurality of light sources are disposed at a rear of an LCD panel opposing a viewing side, and light emitted from the plurality of light source is directly supplied to the LCD panel.

A light emitting diode ("LED") has been increasingly used as a light source in a backlight unit, since an LED has a relatively long lifespan and relatively low power consumption, and allows the LCD to be lightweight and thin. LEDs are widely used in both the edge-type backlight assembly and the direct-type backlight assembly.

A conventional LED used in an edge-type backlight assembly includes a plurality of individual LEDs that each emit light, and provides light distribution to the LCD by emitting light from the LEDs as point sources. Light from the point light sources is then converted into surface light by a light guide plate.

BRIEF SUMMARY OF THE INVENTION

Exemplary embodiments of the present invention are directed to a liquid crystal display device that substantially obviates one or more problems due to limitations and disadvantages of the related art described below.

An exemplary embodiment of the present invention provides an edge-type backlight assembly which adopts an LED as a light source. The LED can be mounted on a base substrate, such as a printed circuit, and the printed circuit may be disposed on a sidewall of a first receiving container, at a corresponding position of an open portion formed on the sidewall of the first receiving container.

According to a first exemplary embodiment of the present invention, there is provided a backlight assembly which includes a printed circuit board including a first side and a second side, a light source emitting a light and mounted on the first side of the printed circuit board, a first receiving container including a bottom plate, at least one sidewall extending from the bottom plate, and an opening portion disposed in the sidewall, and a light guide plate guiding the light emitted from the light source and disposed on the bottom plate of the first receiving container. The printed circuit board may be disposed on an outer surface of the sidewall of the first receiving container, and the printed circuit board overlaps the opening portion of the sidewall of the first receiving container.

The light source may include a light emitting diode. A plurality of the light emitting diode may be disposed on the first side of the printed circuit board, and each light emitting diode may be placed at a predetermined distance from an adjacent light emitting diodes.

A surface area of the printed circuit board may be larger than the surface area of the opening portion formed on the sidewall of the first receiving container. The first side of the printed circuit board may face the outer surface of the sidewall of the first receiving container, and the light emitting diode may emit light toward the light guide plate.

The backlight assembly may further include a coupling member fixing the printed circuit board to the sidewall of the first receiving container.

The coupling member may include a first coupling hole formed on the sidewall of the first receiving container, and a second coupling hole formed on the printed circuit board at a position corresponding to a placement of the first coupling hole, such that the first and second coupling holes are aligned. The coupling member may further include a screw fixing the printed circuit board to the sidewall of the first receiving container solely by being inserted into the aligned first coupling hole and second coupling hole. The screw may include a screw head and a screw body. The screw head may make contact with the outer surface of the sidewall of the first receiving container when the screw is fully inserted into the first coupling hole and the second coupling hole.

The coupling member may include an adhesive member disposed completely between the printed circuit board and the sidewall of the first receiving container.

The printed circuit board may include a metal member as a base.

Exemplary embodiments of the present invention may use only a minimum number of LEDs while maintaining a sufficient distance between the LEDs and the light guide plate for light uniformity. By using only a minimum number of LEDs for the edge-type backlight assembly, production cost may be lowered, and the burden of electric power design may be decreased. Furthermore, by placing the LED mounted printed circuit on the outer surface of the sidewall of the first receiving container, heat can be radiated much more effectively.

According to a second exemplary embodiment of the present invention, there is provided a liquid crystal display device which includes a printed circuit board including a first side and a second side, a light emitting diode emitting a light and disposed on the first side of the printed circuit board, a first receiving container including a bottom plate, at least one sidewall extending from the bottom plate, and an opening portion disposed in the sidewall, a light guiding plate guiding the light emitted from the light source and disposed on the bottom plate of the first receiving container, and a display panel displaying images. The printed circuit board may be disposed on an outer surface of the sidewall of the first receiving container, and the printed circuit board covers the opening portion of the sidewall of the first receiving container.

A plurality of the light emitting diode may be disposed on the first side of the printed circuit board where each light emitting diode is placed at a predetermined distance from an adjacent light emitting diode.

A surface area of the printed circuit board may be larger than a surface area of the opening portion formed on the sidewall of the first receiving container. The first side of the printed circuit board may face the outer surface of the sidewall of the first receiving container and the light emitting diode may emit light toward the light guide plate.

The backlight assembly may further include a coupling member fixing the printed circuit board to the sidewall of the first receiving container.

The coupling member may include a first coupling hole formed on the sidewall of the first receiving container, and a second coupling hole formed on the printed circuit board at a position corresponding to a placement of the first coupling hole. The first and second coupling holes may be aligned with each other. The coupling member may further include a screw fixing the printed circuit board to the sidewall of the first receiving container by being inserted into the aligned first coupling hole and second coupling hole. The screw may include a screw head and a screw body. The screw head may make contact with the outer surface of the sidewall of the first receiving container when the screw is fully inserted into the first coupling hole and the second coupling hole.

The coupling member may include an adhesive member disposed between the printed circuit board and the sidewall of the first receiving container.

The printed circuit board may include a metal member as a base.

BRIEF DESCRIPTION OF THE DRAWINGS

The above and other aspects, features and advantages of the present invention will become more apparent by describing in more detailed exemplary embodiments thereof with reference to the attached drawings in which.

DETAILED DESCRIPTION OF THE INVENTION

Figure 1:
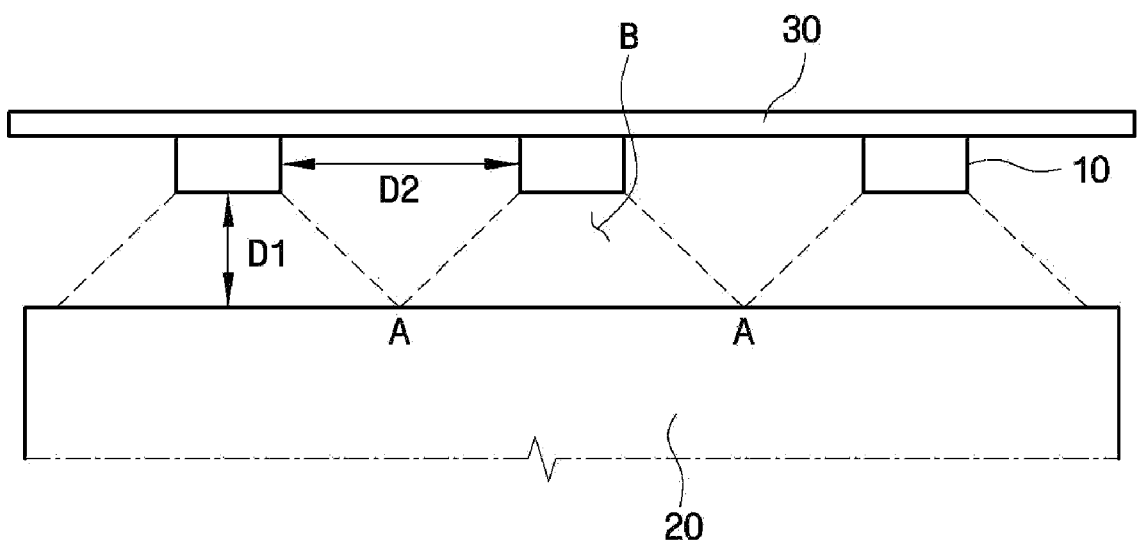
FIG. 1 is a plan view illustrating a hot spot phenomenon in a convention backlight assembly of the Prior Art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "coupled to" another element or layer, the element or layer can be directly on or coupled to another element or layer or intervening elements or layers. In contrast, when an element is referred to as being "directly on" or "directly coupled to" another element or layer, there are no intervening elements or layers present. Like numbers refer to like elements throughout. As used herein, the term "and/or" includes any and all combinations of one or more of the associated listed items. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context.

Hereinafter, the present invention will be described in detail with reference to the accompanying drawings.

Using LEDs in a backlight assembly may have disadvantages. For example, since the LEDs are point light sources, the amount of light incident on a side of the light guide plate may not be uniform. More specifically, the amount of light irradiated onto a region of the light guide plate close to each LED may be greater than the amount of light irradiated onto a region of the light guide plate between the adjacent LEDs. For this reason a hot spot may occur, where a region of the backlight is bright while an adjacent region is undesirably darker.

Referring to FIG. 1 for further explanation, FIG. 1 is a plan view illustrating a hot spot in a conventional backlight assembly of the prior art. A plurality of an LED 10 is disposed on a substrate 30, such as a printed circuit board. Both the printed circuit board 30 and the LED 10 may be disposed at an inner area of a receiving container. An area A of light guide plate 20 depicted in FIG. 1, receives limited light from an LED 10, or does not receive light at all, and therefore area A is undesirably darker than an adjacent region of the light guide plate 20. Consequently, the hot spot can be seen in the area A.

In order to avoid the hot spot, light emitted from neighboring LEDs 10 should overlap with area A. A light emitting angle B of an individual LED 10 is about 120 degrees. With such light emitting angle, a ratio between D2, a distance between two adjacent LEDs 10, and D1, a distance between an LED 10 and the light guide plate 20, should be more than 1:1.4 to avoid the hot spot. Since the ratio of D2 to D1 in FIG. 1 is less than 1:1.4, the hot spot is generated at area A of the light guide plate 20.

To make the backlight assembly as compact as possible, it is further desirable to reduce the distance D1 between the LED 10 and the light guide plate 20. However, while D1 can be shortened by reducing D2, more LEDs are needed in the backlight assembly, undesirably causing an increase in material and production cost. Furthermore, using more LEDs puts more burden on electric power design, since it is desirable to keep a current within the backlight assembly as low as possible.

Figure 2:
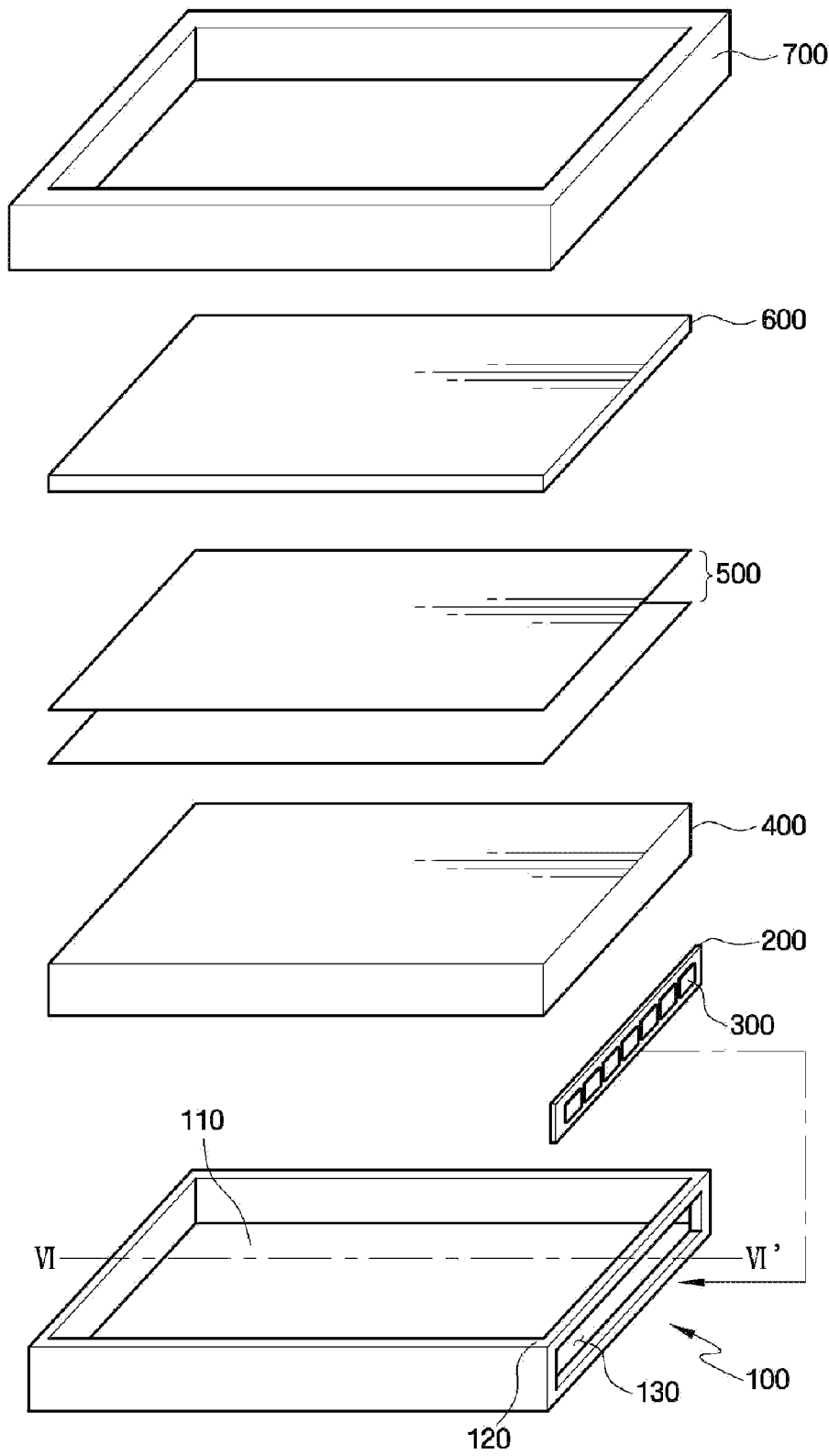
FIG. 2 is an exploded perspective view illustrating a first exemplary embodiment of a liquid crystal display according to the present invention.

FIG. 2 is an exploded perspective view of an exemplary embodiment of a liquid crystal display device according to the invention. Referring to FIG. 2, the backlight assembly may include a first receiving container 100, a base substrate 200, such as a printed circuit board, a light source 300, a light guiding member 400, such as a light guide plate, an optical member 500, a display panel 600 and a second receiving container 700.

The first receiving container 100 may include a bottom planar surface member (e.g., plate) 110 and at least one sidewall 120 extended upwardly from an edge of the bottom plate 110. The first receiving container 100 may include a plurality of the sidewall 120 each extending substantially perpendicular to respective edges of the bottom plate 110. The bottom plate 110 and the sidewalls 120 of the first receiving container 100 collectively define a receiving area. Pairs of the sidewall 120 are disposed facing and substantially parallel to each other, and opposing each other with respect to the receiving area of the bottom plate 110. The bottom plate 110 may be a solid, continuous and indivisible member, or alternatively, the bottom plate 110 may have an area absent material such as to expose elements of the liquid crystal display device to an exterior (e.g., rear) of the first receiving container 100.

An insertion member, such as opening portion 130, may be formed on the sidewall 120. A single one, or a multiple of the opening portion 130 may be disposed in a single sidewall 120, or respectively in a multiple of the sidewall 120. The opening portion 130 extends completely through the sidewall 120 from an outer surface of the sidewall 120, to an inner surface of the sidewall 120 facing the receiving area of the first receiving container 100. The opening portion 130 is an area where material of the sidewall 120 is not disposed, and is considered an enclosed opening. The opening portion 130 penetrates the sidewall 120 of the first receiving container 100, and the sidewall 120 solely defines the enclosed opening portion 130.

Referring to FIG. 1, the light source 300 may be mounted on the printed circuit board 200. The light source 300 may be light emitting diodes ("LEDs"), cold cathode fluorescent lamps ("CCFLs"), or various other types of light generating and emitting devices. A plurality of the light source 300 may be disposed on a single one of the printed circuit board 200. The plurality of the light source 300 may be arranged substantially linearly (e.g., in a row) along a longitudinal direction of the printed circuit board 200, and disposed spaced apart from each other in the longitudinal direction of the printed circuit board. Alternatively, multiple rows of the light source 300 may be used in the backlight assembly.

The light guide plate 400 may be disposed in a space, e.g., the receiving area, formed by the bottom plate 110 and the sidewall 120. Spacing may exist between the light guide plate 400 and the light source 300, such that the light guide plate 400 and the light source 300 are disposed separated from each other by a predetermined distance. The spacing can be used to spread light generated by the light source 300 and incident on the light guide plate 400, substantially uniformly.

In an exemplary embodiment, with a light emitting angle of the light source 300 being less than about 180 degrees, the spacing between the light guide plate 400 and the light source 300 is needed to provide enough room for the light generated by the light source 300 to spread substantially uniformly. Moreover, the spacing functions as a protective barrier from external shocks. If the light guide plate 400 makes direct contact with the light source 300, external shocks received by the light guide plate 400 is transmitted to the light source 300, and such event may cause undesirable and/or critical damage to the light source 300.

The optical members 500 are disposed on the light guide plate 400, and serve to diffuse and focus light coming from the light guide plate 400.

In the illustrated embodiment, the display panel 600 includes a pair of glass substrates, and a liquid crystal layer provided there between (not shown). The display panel 600 displays images using light originally generated by the light source 300, which travels through the elements of the backlight assembly to be incident on the display panel 600.

The second receiving container 700 may be coupled to the first receiving container 100, so that a periphery of an upper surface of the display panel 600 received in the first receiving container 100 is covered and overlapped with a portion of the second receiving container 700. A window exposing the display panel 600 to the outside of the liquid crystal display device, may be disposed on an upper surface of the second receiving container 700. An uppermost side of the liquid crystal display device shown in FIG. 2 may be hereinafter referred to as a "front side" or a "viewing side." Conversely, a lowermost side of the liquid crystal display device shown in FIG. 2 may be hereinafter referred to as a "rear side."

In exemplary embodiments, the first receiving container 100, the base substrate 200, the light source 300, the light guiding member 400, the optical member 500, the display panel 600 and the second receiving container 700 of the backlight assembly, may all be disposed directly on and contacting each other, or alternatively, there may be intervening elements between some and/or all of these features.

Figure 3:
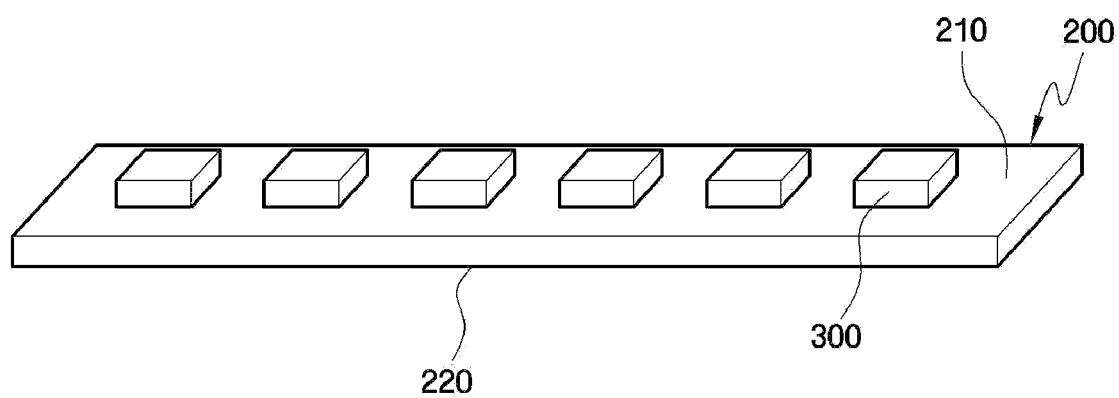
FIG. 3 is a front perspective view illustrating a first exemplary embodiment of a printed circuit board according to the present invention.

FIG. 3 is a front view of an exemplary embodiment of the printed circuit board 200. The printed circuit board 200 may include a first side 210 and a second side 220 opposing the first side. The light source 300 may be mounted on the first side 210 of the printed circuit board 200, such as to directly contact the first side 210 of the printed circuit board 200. In an exemplary embodiment, the printed circuit board 200 may include one of a metal member, an epoxy member and a ceramic member as a base, or any combination of the foregoing materials. The light source 300 may be mounted on the printed circuit board 200 by an of a number of processes relating to Surface Mounted Technology ("SMT").

Each light source 300 may include a base surface contacting the first surface 210 of the printed circuit 200, and side surfaces extending from the base surface and the first surface 210 of the printed circuit board 200. The light source 300 may further include a single light emitting surface, or a plurality of the light emitting surface. Referring to FIG. 3, the upper surface of the light source 300, opposing the base surface, may be considered as a single light emitting surface, or the upper surfaces and a portion (or all) of the side surfaces may be considered as a plurality of a light emitting surface of the light source 300. While a single row of the light source 300 is illustrated in FIG. 3, the present invention is not limited thereto, and a plurality of rows of the light source 300 may be disposed on the printed circuit board 200.

In the illustrated embodiment, a plurality of the light source 300 are disposed directly on the first surface 210 of the printed circuit board 200. The plurality of the light source 300 are arranged substantially linearly along a longitudinal direction of the printed circuit board 200 and separated by a substantially uniform distance from each other along the longitudinal direction, such as in a plan view. Each of the light sources 300 is spaced away from edges of the printed circuit board 200.

Figure 4:
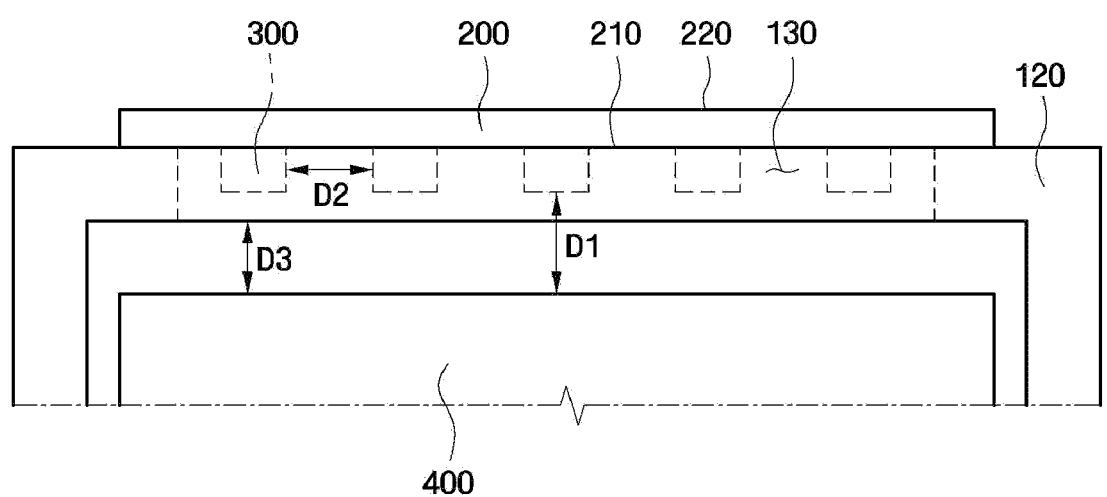
FIG. 4 is a plan view illustrating a first exemplary embodiment of a backlight assembly according to the present invention.

FIG. 4 is a plan view of a first exemplary embodiment of a backlight assembly according to the present invention. The printed circuit board 200 is disposed on a portion of an outer surface of the sidewall 120 of the first receiving container, covering the opening portion 130 of the sidewall 120. The printed circuit board 200 may be disposed in a way that a portion of the first side 210 of the printed circuit board 200 faces the light guide plate 400, and directly contacts a portion of the outer surface of the sidewall 120, as illustrated in FIG. 4. An entire of the printed circuit board 200 is disposed at an exterior of the first receiving container 100.

The light source 300 mounted on the first side 210 of the printed circuit board 200 may be accommodated in the opening portion 130 of the sidewall 120, indicated by the two vertical dotted lines at left and right areas of the sidewall 120 in FIG. 4. Only the light source 300 may be disposed at an inner area of the first receiving container 100, where none of the printed circuit board 200 extends into the inner area of the first receiving container. A light emitting surface of the light source 300 may face a light incident surface of the light guide plate 400, and light generated by the light source 300 may be directly incident onto the light incident surface of the light guide plate 400, as illustrated in FIG. 4.

When a portion of the printed circuit board 200 is disposed on a portion of the outer surface of the sidewall 120, an entire of the printed circuit board 200 may be disposed outside of the first receiving container 100, while the light source 300 protrudes from the printed circuit board 200 and into an inner area of the first receiving container 100, as illustrated by the dotted lines of the light source 300 in FIG. 4.

Referring to FIG. 2, FIG. 3 and FIG. 4, the printed circuit board 200 is assembled with the sidewall 120 of the first receiving container 100, such as by being disposed on the outer surface of the sidewall 120. A surface area of the first surface 210 of the printed circuit board 200 may be larger than that of the opening portion 130. The printed circuit board 200 may cover and overlap the entire opening portion 130 of the sidewall 120. When the printed circuit board 200 overlaps the entire of the opening portion 130 and contacts the outer surface of the sidewall 120 at all areas adjacent to the opening portion 130, particle contamination entering into the first receiving container 100 from between the printed circuit board 200 and the outer surface of the sidewall 120, may be reduced or effectively prevented.

The printed circuit board 200 including the light source 300 disposed thereon, is placed outside of the sidewall 120 of the first receiving container 100. Since a thickness of the printed circuit board 200 is not disposed in the inner area of the first receiving container 100, the light source 300 may be disposed further away from the light guide plate 400. When the light source 300 is disposed further away from the light guide plate D1 may be advantageously lengthened, especially when compared to a backlight assembly with a printed circuit placed inside a receiving container.

As discussed above, a ratio between D2, a distance between two adjacent LEDs 10, and D1, a distance between a distal end of an LED 10 and a light guide plate, must be more than 1:1.4 in order to maintain light substantial uniformity.

As can be seen in FIG. 1, a hot spot phenomenon, which refers to spots generated on a display screen due to light irregularity, occurs when the ratio between D2 and D1 is less than 1:1.4. Referring to the illustrated embodiment in FIG. 4, by placing a portion of or the entire of the printed circuit board 200 on the outer surface of the sidewall 120, D3, a distance between an inner edge of the sidewall 120 and a boundary edge of the light guide plate 400, can be maintained as narrow as possible, while still securing the ratio between D1 and D2 to 1:1.4, while maintaining D1 to be as wide as possible.

By securing the ratio of D2 to D1 to be more than 1:1.4, the hot spot can be advantageously reduced or effectively avoided. Additionally, by maintaining D1 as wide as possible, a minimum number of light sources 300 can be used. By using a minimum number of light sources 300, materials and production cost can be advantageously reduced, while requiring less power to operate the light sources 300. Furthermore, by placing a portion of an the entire of the LED mounted printed circuit board 200 outside the first receiving container 100, heat generated by the light sources 300 may be advantageously dissipated effectively.

Figure 5:
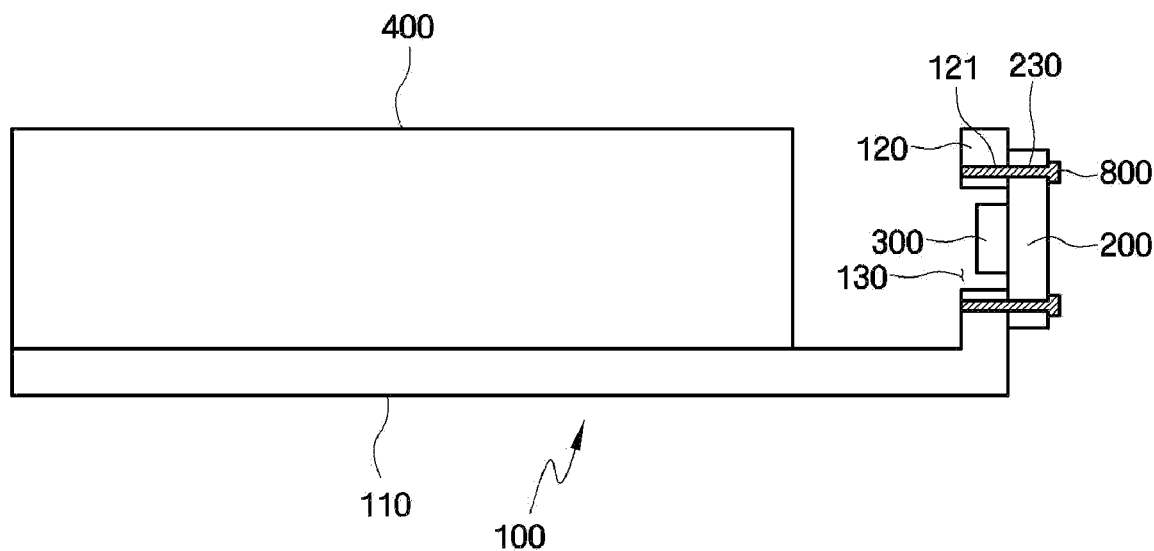
FIG. 5 is a cross-sectional view of a second exemplary embodiment of a backlight assembly taken along line VI-VI' of FIG. 2 according to the present invention.
Figure 6:
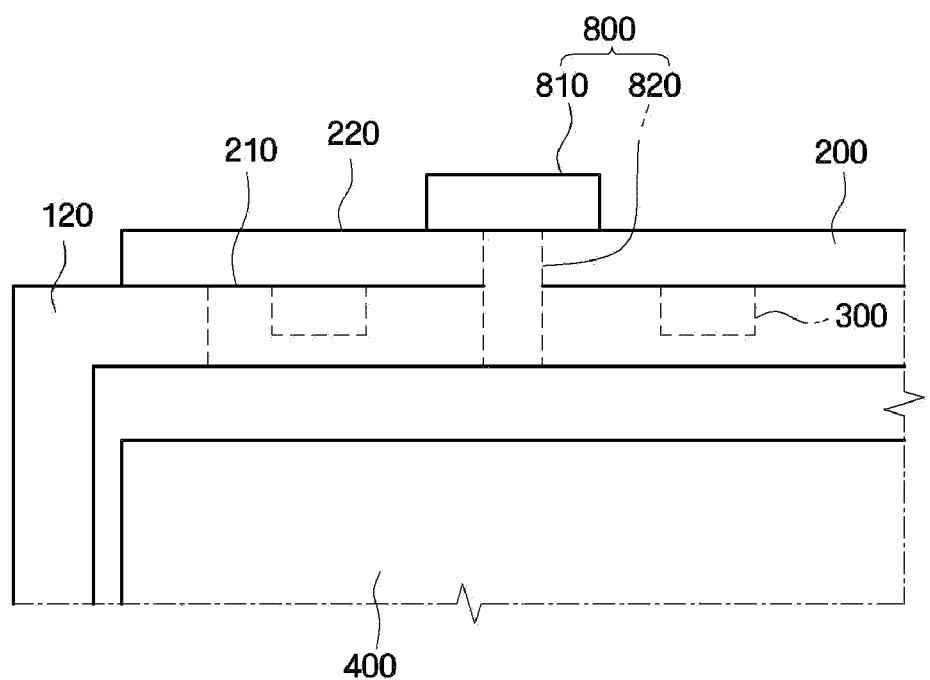
FIG. 6 is a plan view illustrating the second exemplary embodiment of the backlight assembly in FIG. 5.

FIG. 5 is a cross sectional view of the second exemplary embodiment of the backlight assembly taken along line VI-IV' of FIG. 2. FIG. 6 is a plan view of the second exemplary embodiment of the backlight assembly illustrated in FIG. 5.

Referring to FIG. 5 and FIG. 6, the backlight assembly of the second exemplary embodiment may include a coupling member 800. The coupling member 800 fixes the printed circuit 200 to the sidewall 120 of the first receiving container 100. The sidewall 120 of the first receiving container 100 may include a first coupling hole 121 formed in the sidewall 120. The printed circuit 200 may include a second coupling hole 230 formed in the printed circuit 200. The first coupling hole 121 and the second coupling hole 230 may extend completely through a thickness of the sidewall 120 and the printed circuit board 200, respectively, or may extend only partially through either the sidewall 120 or the printed circuit board 200. A hole extending completely through a member, may hereinafter be referred to as a "through hole."

The first coupling hole 121 is formed around the opening portion 130 of the sidewall 120 of the first receiving container 100. The first coupling hole 121 may disposed adjacent to inner edges of the sidewall 120 defining the opening portion 130, such as being disposed at a distance from the inner edges of the sidewall 120. The second coupling hole 230 is formed on the printed circuit board 200 at a position corresponding to a placement of the first coupling hole 121, such that the first coupling hole 121 and the second coupling hole 230 are aligned with each other to accept the coupling member 800.

In an exemplary embodiment, the coupling member 800 may include a fastening member, such as a screw. The screw 800 illustrated in FIG. 5 and FIG. 6 fixes the printed circuit board 200 to the sidewall 120 of the first receiving container 100, such by being inserted into the first coupling hole 121 and the second coupling hole 230. The printed circuit board 200 may be affixed to the sidewall 120 solely by the insertion of the screw 800 in to the first coupling hole 121 and the second coupling hole 230. In the illustrated embodiment, an insertion direction of the screw 800 is from the printed circuit board 200 at an outside of the first receiving container 100, completely through printed circuit board 200, and into a portion of the sidewall 120 of the first receiving container 100, the portion of the sidewall 120 being substantially an whole thickness of the sidewall 120. In an alternative embodiment, the coupling member 800 may be inserted from the inner area of the first receiving container 100, completely through the sidewall 120 and into a portion of the printed circuit board 200.

As can be seen from FIG. 6, the screw 800 may include a screwhead 810 and a screw body 820 (illustrated with dotted lines). When the insertion is complete, the screw head 810 may make contact with the second side 220 of the printed circuit board 200. Alternatively, when the insertion of the coupling member 800 is complete, a portion of or an entire of the screw head 810 may be disposed within (e.g., overlapping) a thickness of the sidewall 120. The outer surface of the screw head 810 may be disposed flush, or coplanar with, the second surface 220 of the printed circuit board, such as to make the backlight assembly as compact as possible.

The sidewall 120 of the first receiving container 100 may include more than one first coupling hole 121, and the number of second coupling holes 230 formed on the printed circuit board 200 may be equal to that of the first coupling hole 121, since the first coupling hole 121 and second coupling hole 230 are aligned to accommodate the coupling member 800.

In the illustrated embodiments of FIG. 4 and FIG. 5, at least a portion of, and essentially an entire of, the printed circuit board 200 is disposed on the outer surface of the sidewall 120. The distance D3 between an inner edge of the sidewall 120 and a boundary edge of the light guide plate 400, is maintained as narrow as possible to make the backlight assembly relatively compact, while still securing the ratio of D2 to D1 to 1:1.4 and maintaining D1 to be as wide as possible.

Advantageously, by securing the ratio of D2 to D1 to be more than 1:1.4, a hot spot is reduced or effectively avoided. Additionally, by maintaining D1 as wide as possible, a minimum number of light sources 300 can be used, and a materials and production cost can be advantageously reduced, while requiring less power to operate the light sources 300. Furthermore, by placing a portion of an the entire of the LED mounted printed circuit board 200 outside the first receiving container 100, heat generated by the light sources 300 may be advantageously dissipated effectively.

Figure 7:
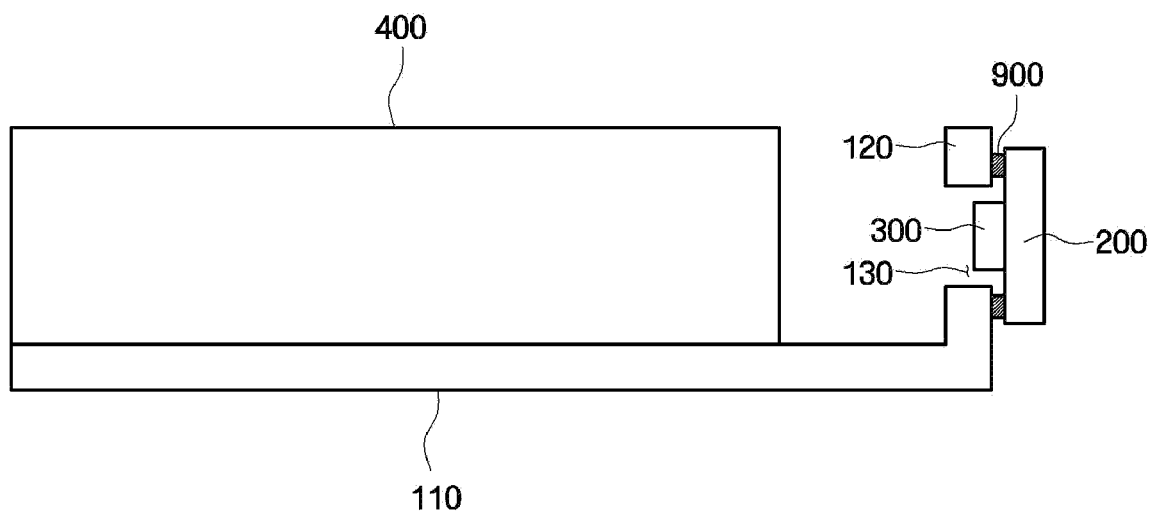
FIG. 7 is a cross-sectional view of a third exemplary embodiment of a backlight assembly taken along line VI-VI' of FIG. 2 according to the present invention.
Figure 8:
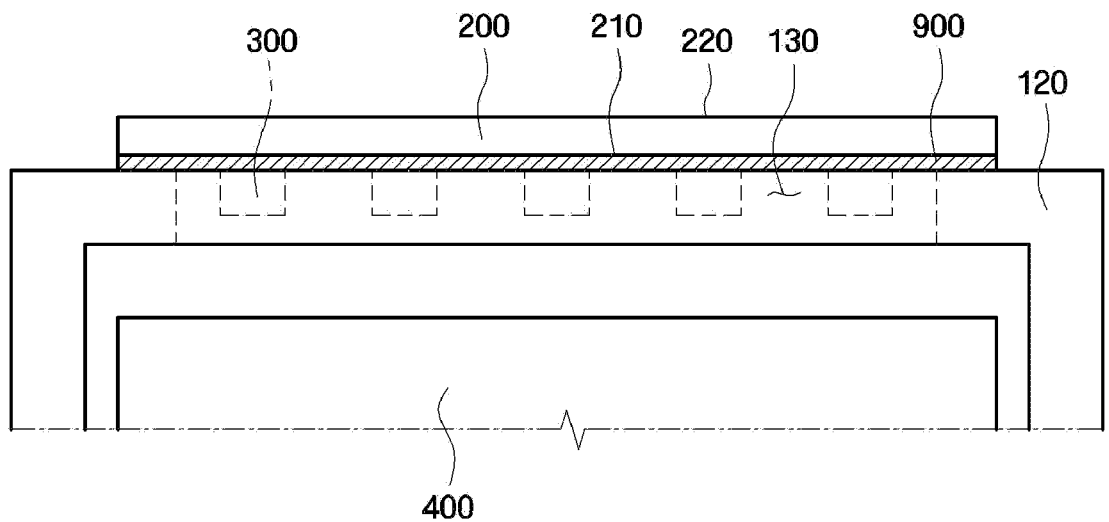
FIG. 8 is a plan view illustrating the third exemplary embodiment of a backlight assembly in FIG. 7.

FIG. 7 is a cross sectional view of a third exemplary embodiment of a backlight assembly taken along line VI-VI' of FIG. 2. FIG. 8 is a plan view of the third exemplary embodiment of the backlight assembly illustrated in FIG. 7.

Referring to FIG. 7 and FIG. 8, a backlight assembly may include a fixing member 900, such as an adhesive material. The adhesive member 900 is disposed between the printed circuit board 200 and the sidewall 120 of the first receiving container 100. A whole of the adhesive member 900 is disposed between the printed circuit board 200 and the outer surface of the sidewall 120. The adhesive member 900 may be disposed along a periphery of the printed circuit board 200, the periphery of the printed circuit board 200 overlapping with a portion of the sidewall 120 of the first receiving container 100, such as adjacent to the opening portion 130. The adhesive member 900 may be a single, continuous and indivisible member disposed adjacent to all inner edges of the sidewall 120 defining the opening 130. Alternatively, the adhesive member 900 may be a plurality of individual units disposed at the periphery of the printed circuit board 200 overlapping with a portion of the sidewall 120 of the first receiving container 100. In an exemplary embodiment, the adhesive member 900 may include one of a two-sided adhesive tape, silicon, and epoxy, or any combination of the aforementioned materials.

In the illustrated embodiments of FIG. 7 and FIG. 8, at least a portion of, and essentially an entire of, the printed circuit board 200 is disposed on the outer surface of the sidewall 120. The distance D3 between an inner edge of the sidewall 120 and a boundary edge of the light guide plate 400, is maintained as narrow as possible to make the backlight assembly relatively compact, while still securing the ratio of D2 to D1 to 1:1.4 and maintaining D1 to be as wide as possible. Advantageously, by securing the ratio of D2 to D1 to be more than about 1:1.4, a hot spot is reduced or effectively avoided. Additionally, by maintaining D1 as wide as possible, a minimum number of light sources 300 can be used, and a materials and production cost can be advantageously reduced, while requiring less power to operate the light sources 300. Furthermore, by placing a portion of an the entire of the LED mounted printed circuit board 200 outside the first receiving container 100, heat generated by the light sources 300 may be advantageously dissipated effectively.

While the present invention has been particularly shown and described with reference to the exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A backlight assembly comprising:
   a first receiving container comprising a bottom plate and at least one sidewall extending from the bottom plate, wherein the sidewall comprises an enclosed single opening portion, the sidewall solely defining the enclosed single opening portion;
   a printed circuit board disposed contacting an outer surface of the at least one sidewall, the printed circuit board comprising a first side and a second side opposing the first side;
   a plurality of light sources on the first side of the printed circuit board and generating light, such that the generated light is emitted through the opening portion of the sidewall and each of the light sources overlaps the single opening portion;
   a light guide plate disposed on the bottom plate of the first receiving container, and guiding light emitted from the light source and incident to a light incident surface of the light guide plate toward a display side of a display device.

2. The backlight assembly of claim 1, wherein the light sources include light emitting diodes.

3. The backlight assembly of claim 2, wherein the plurality of light emitting diodes is on the first side of the printed circuit board, and each light emitting diode is at a predetermined distance from an adjacent light emitting diode along a longitudinal direction of the printed circuit board.

4. The backlight assembly of claim 3, wherein a first surface area of the first surface of the printed circuit board, is larger than a second surface area of the opening portion formed on the sidewall of the first receiving container.

5. The backlight assembly of claim 4, wherein the first side of the printed circuit board faces the outer surface of the sidewall of the first receiving container, and the light emitting diodes emits light toward the light incident surface of the light guide plate.

6. A backlight assembly of claim 5, further comprising a coupling member fixing the printed circuit board to the sidewall of the first receiving container.

7. A backlight assembly of claim 6, wherein the coupling member includes a first coupling hole disposed in the sidewall of the first receiving container, and a second coupling hole disposed in the printed circuit board, the first coupling hole and the second coupling hole being aligned with each other.

8. The backlight assembly of claim 7, wherein the coupling member further includes a screw, the screw fixing the printed circuit board to the sidewall of the first receiving container solely by being inserted into the aligned first coupling hole and second coupling hole.

9. A backlight assembly of claim 8, wherein the screw comprises a screwhead and a screw body, and the screwhead makes contact with the second side of the printed circuit board when the screw is fully inserted into the first coupling hole and the second coupling hole.

10. The backlight assembly of claim 6, wherein the coupling member includes an adhesive member, and an entire of the adhesive member is disposed between the printed circuit board and the sidewall of the first receiving container.

11. A backlight assembly of claim 5, wherein the printed circuit board includes a metal member as a base.

12. The backlight assembly of claim 3, wherein a ratio of the predetermined distance between adjacent light emitting diodes, to a distance between the light emitting diodes and the light guide plate taken substantially perpendicular to the longitudinal direction of the printed circuit board, is about 1:1.4.

13. A liquid crystal display device, comprising:
   a first receiving container comprising a bottom plate, and at least one sidewall vertically extending from the bottom plate, wherein the sidewall comprises an enclosed single opening portion, the sidewall solely defining the enclosed single opening portion;
   a printed circuit board disposed contacting an outer surface of the at least one sidewall, the printed circuit board comprising a first side and a second side opposing the first side;
   a display panel displaying images;
   a plurality of light emitting diodes on the first side of the printed circuit board, such that light emitted from the light emitting diodes is emitted through the opening portion of the sidewall and each of the light emitting diodes overlaps the single opening portion;
   a light guide plate disposed on the bottom plate of the first receiving container and including a light incident surface receiving the light emitted from the light source, the light guide plate guiding the light emitted from the light source towards the display panel.

14. The liquid crystal display device of claim 13, wherein the plurality of light emitting diodes is on the first side of the printed circuit board, where each light emitting diode is placed at a predetermined distance from an adjacent light emitting diode.

15. The liquid crystal display device of claim 14, wherein a surface area of the printed circuit board is larger than a surface area of the opening portion formed on the sidewall of the first receiving container.

16. The liquid crystal display device of claim 15, wherein the first side of the printed circuit board faces the outer surface of the sidewall of the first receiving container, and the light emitting diodes emits light toward the light incident surface of the light guide plate.

17. The liquid crystal display device of claim 16, further comprising a coupling member fixing the printed circuit board to the sidewall of the first receiving container.

18. The liquid crystal display device of claim 17, wherein the coupling member includes a first coupling hole disposed in the sidewall of the first receiving container, and a second coupling hole disposed in the printed circuit board, and the first coupling hole is aligned with the second coupling hole.

19. The liquid crystal display device of claim 18, wherein the coupling member further includes a screw, the screw fixing the printed circuit board to the sidewall of the first receiving container solely by being inserted into the aligned first coupling hole and second coupling hole.

20. The liquid crystal display device of claim 19, wherein the screw comprises a screw head and a screw body, and the screw head makes contact with the second side of the printed circuit board when the screw is inserted into the first coupling hole and the second coupling hole.

21. The liquid crystal display device of claim 17, wherein the coupling member includes an adhesive member, and an entire of the adhesive member is disposed between the printed circuit board and the sidewall of the first receiving container.

* * * * *